US011481482B2

(12) United States Patent
Mookken et al.

(10) Patent No.: US 11,481,482 B2
(45) Date of Patent: Oct. 25, 2022

(54) SECURING AN APPLICATION FRAMEWORK FROM SHARED LIBRARY SIDELOAD VULNERABILITIES

(71) Applicant: McAfee, LLC, San Jose, CA (US)

(72) Inventors: Varghese Paul Mookken, Bangalore (IN); Sajith Kumar Thadathil Pilakkavil, Bangalore (IN)

(73) Assignee: McAfee, LLC, San Jose, CA (US)

( * ) Notice: Subject to any disclaimer, the term of this patent is extended or adjusted under 35 U.S.C. 154(b) by 355 days.

(21) Appl. No.: 16/564,597

(22) Filed: Sep. 9, 2019

(65) Prior Publication Data

US 2021/0073374 A1   Mar. 11, 2021

(51) Int. Cl.
| | | |
|---|---|---|
| *G06F 21/51* | (2013.01) | |
| *G06F 21/53* | (2013.01) | |
| *G06F 21/54* | (2013.01) | |
| *G06F 9/445* | (2018.01) | |
| *G06F 21/56* | (2013.01) | |
| *G06F 21/57* | (2013.01) | |

(52) U.S. Cl.
CPC .......... *G06F 21/51* (2013.01); *G06F 9/44521* (2013.01); *G06F 9/44563* (2013.01); *G06F 21/53* (2013.01); *G06F 21/54* (2013.01); *G06F 21/566* (2013.01); *G06F 21/57* (2013.01)

(58) Field of Classification Search
CPC .......... G06F 21/51; G06F 21/53; G06F 21/54; G06F 21/566; G06F 21/57; G06F 9/44521; G06F 9/44563
See application file for complete search history.

(56) References Cited

U.S. PATENT DOCUMENTS 10,678,917 B1* 6/2020 Witten ................. G06F 21/565
2011/0179430 A1* 7/2011 Kim ..................... G06F 9/44521
719/331

(Continued)

OTHER PUBLICATIONS

Capek, Petr; Kral, Erik; Senkerik, Roman; "Advanced Testing Tool for .NET Applications", International Conference on Computational Science and Computational Intelligence (CSCI), IEEE, Dec. 14-16, 2017, 2 pages.*

(Continued)

*Primary Examiner* — Victor Lesniewski
(74) *Attorney, Agent, or Firm* — Patent Capital Group

(57) ABSTRACT

There is disclosed in one example a computing apparatus, including: a processor and a memory; an operating system; an application framework including instructions to search a target directory for one or more shared libraries and to attempt to load the one or more shared libraries if found; and an application including: a library file including a primary feature module to provide a primary feature of the application, the primary feature module structured to operate within the application framework, wherein the library file is not independently executable by the operating system; and an unmanaged executable binary to host the library file, wherein the unmanaged executable binary is not managed by the application framework, and includes hooks to intercept the application framework's attempt to load the one or more shared libraries, and to provide security services to the one or more shared libraries before permitting the application framework to attempt to load the one or more shared libraries.

20 Claims, 9 Drawing Sheets

(56) References Cited

U.S. PATENT DOCUMENTS

| | | | | |
|---|---|---|---|---|
| 2015/0096018 | A1* | 4/2015 | Mircescu | G06F 21/56 |
| | | | | 726/23 |
| 2017/0032121 | A1* | 2/2017 | Kim | G06F 21/56 |
| 2018/0089440 | A1* | 3/2018 | Fiedler | G06F 8/316 |
| 2019/0080081 | A1* | 3/2019 | Goodridge | G06F 21/53 |
| 2019/0188384 | A1* | 6/2019 | Tanda | G06F 21/566 |
| 2019/0243976 | A1* | 8/2019 | Kuskov | G06F 21/51 |
| 2019/0325143 | A1* | 10/2019 | Kalinin | G06F 21/54 |
| 2022/0138311 | A1* | 5/2022 | Tumblin | G06F 21/52 |
| | | | | 726/23 |

OTHER PUBLICATIONS

An, Zhiyuan; Liu, Haiyan; "Achievement of Dynamic Link Library Insertion under .Net", International Symposium on Intelligence Information Processing and Trusted Computing, IEEE, Oct. 28-29, 2010, 3 pages.*

* cited by examiner

US 11,481,482 B2

SECURING AN APPLICATION FRAMEWORK FROM SHARED LIBRARY SIDELOAD VULNERABILITIES

FIELD OF THE SPECIFICATION

This application relates in general to computer security, and more particularly, though not exclusively, to securing an application framework from shared library sideload vulnerabilities.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
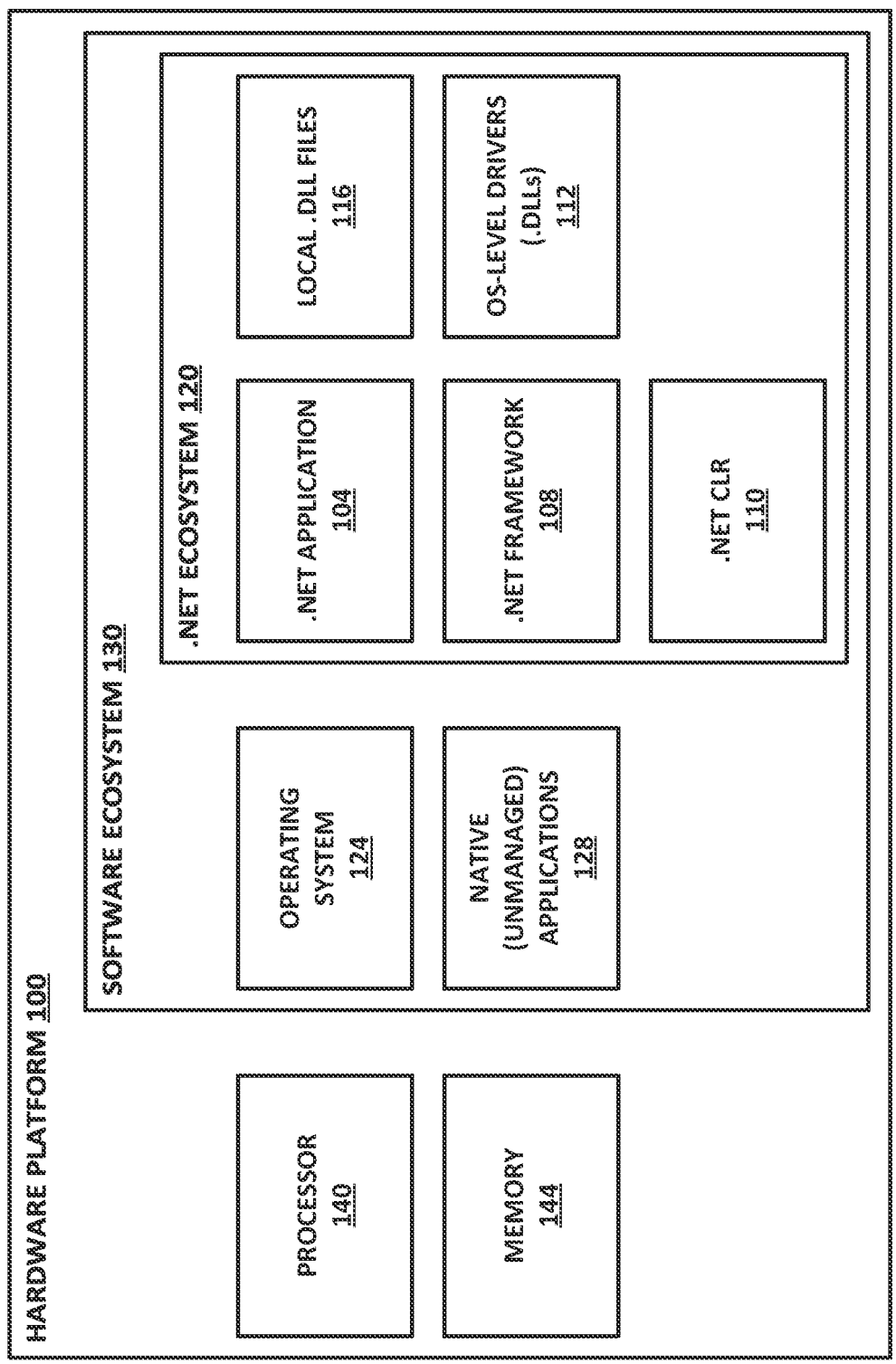
FIG. 1 is a block diagram of a hardware platform.

In an example, there is disclosed a computing apparatus, comprising: a processor and a memory; an operating system; an application framework including instructions to search a target directory for one or more shared libraries and to attempt to load the one or more shared libraries if found; and an application comprising: a library file comprising a primary feature module to provide a primary feature of the application, the primary feature module structured to operate within the application framework, wherein the library file is not independently executable by the operating system; and an unmanaged executable binary to host the library file, wherein the unmanaged executable binary is not managed by the application framework, and comprises hooks to intercept the application framework's attempt to load the one or more shared libraries, and to provide security services to the one or more shared libraries before permitting the application framework to attempt to load the one or more shared libraries.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Microsoft's .NET framework is a software framework that provides a large class library called the framework class library (FCL). .NET provides a flexible programming environment in which language interoperability is an important feature. Using .NET, an application programmer can write classes or modules in any supported language, and they can be used in any supported project. By design, the .NET framework supports any computing language that conforms to the common language infrastructure (CLI) specification. This includes popular programming languages such as C++, C #, F #, VisualBasic.net, Jscript.net, and even some versions of very old programming languages such as common business-oriented language (COBOL).

VisualStudio.net is able to integrate modules and classes written in these various programming languages, and to provide a final executable that runs as a managed process under the common language runtime (CLR). The CLR is an application virtual machine that provides low-level services including security, memory management, exception handling, and hardware interfaces. Code compiled into the .NET framework is usually compiled into a common intermediate language (CIL), and the CIL runs on the CLR.

In .NET parlance, an application that does not run under the .NET framework may be referred to as an "unmanaged process." For example, an unmanaged process may be a traditional C++ application that compiles directly to binary object code, and that runs directly on the hardware instead of in the .NET CLR. While such unmanaged processes do not realize the convenience of the .NET framework programming environment, they do have advantages in that they may be optimized to run faster, and they may have more low-level access to system resources.

Embodiments of the present specification take advantage of the common object model (COM) to realize a hybrid application that takes advantage of the .NET framework, but is hosted on an unmanaged process that can perform additional low-level operations, including security operations. In one example, such a hybrid configuration is used to work around a potential security exploit in the .NET framework. Specifically, when a .NET application loads, by design the .NET application relies on certain dynamic link libraries (DLLs), which may provide some auxiliary functionality to the application. Many of these libraries are commonly provided as operating system (OS) standard libraries. However, it is sometimes desirable to override these standard OS libraries with local versions that may provide different functionality.

For example, a particular application may work best with version 1.2 of a particular DLL, but the OS standard library has moved on to version 1.3, which breaks compatibility with version 1.2. So the application ships with version 1.2 of the DLL, which is installed in the same directory as the executable application. When the .NET CLR launches with the managed application, the .NET CLR first searches the local directory of the application executable for a list of DLLs. If any of those DLLs are found, the local directory version is loaded instead of the OS standard version. Presently, there is no known native way within the .NET CLR to block or work around this behavior. This can be a security issue for security-sensitive applications, because a malicious actor could load a malicious version of a standard DLL into the local directory of a .NET application, and the .NET CLR will load this version of the DLL instead of the OS standard version. Thus, however well-crafted the native .NET application is, its entire security framework can be undermined by a malicious DLL in the application directory. At present, it is believed that this behavior is as-designed by Microsoft, and Microsoft has no known plans to change the behavior of the .NET CLR in this respect.

This creates a security aperture for high-profile security targets, such as a security agent, a password manager, or some other program with serious security implications. If a malicious actor, a bad actor, or a negligent actor can replace the standard DLL with a malicious or negligent version of the DLL, then the security of a high-profile target can be completely undermined.

This feature of Microsoft.net framework may be considered a design flaw that makes all .NET applications vulnerable to DLL hijacking attacks. With this design flaw, DLLs can be loaded insecurely into .NET processes. Adversaries or bad actors could take advantage of this design flaw and make legitimate programs load malicious DLLs that harm the end user's or enterprise's machine. Not only does this affect the end user, but it can also affect the brand value or reputation of the legitimate application programmer. As discussed above, Microsoft apparently acknowledges the possibility of this attack, but considers this aspect of .NET framework to be a design feature, and does not appear to have any plans to change this aspect of the .NET framework.

Thus, any product built using the .NET framework is vulnerable to DLL hijacking attacks. This is particularly difficult for a security services provider, such as MCAFEE, LLC, because their products are particularly designed to defeat security flaws. Thus, in the absence of a change in the operation of the .NET framework, a workaround may be necessary to circumvent the design and alleviate the vulnerability caused by the .NET platform. As described above, a hybrid application in which an unmanaged process is written in a lower-level language (e.g., C++) can provide the necessary security.

For example, at design time, the application programmer may design the .NET application according to the ordinary process. However, the .NET framework application is not compiled into a final executable format. Rather, it is compiled as a DLL, which can then be hosted on another executable. Once the other executable calls the DLL, the DLL can be loaded as a mostly ordinary .NET process. But, the use of the native binary unmanaged host application provides the ability to hook calls, including the calls of the CLR to load DLLs. When the CLR makes a call to load the DLL, the call is intercepted via API hooks, and code within the unmanaged binary can perform security scans, such as checking a digital signature of the DLL, or checking it against a global database of known malicious libraries. The DLL is allowed to load only if it passes the security checks. If any DLL fails the security checks, then an appropriate security action may be taken, such as terminating the unmanaged parent application completely. This ensures that it is more difficult to hijack the unmanaged parent application via malicious DLLs.

The .NET CLR itself can be provided to the unmanaged host application as a standard object using the common object model (COM). The invocation of the CLR as a COM object ensures that the unmanaged host application can insert the appropriate API hooks to intercept the DLL load calls, to provide additional security functions.

An illustrative test case for this kind of attack is illustrated now. In this illustration, an attacker manages to download a malicious DLL into the "DOWNLOADS" folder of a Windows user. This malicious DLL has the name of a common DLL loaded by .NET applications such as "version.DLL," "kernel32.dll," or some other similar DLL that is loaded by .NET framework applications of interest. The malicious DLL may even provide most of the same code as the known good DLL, but also includes malicious subroutines that perform malicious work for the attacker.

Later, the Windows user downloads a .NET application into the "DOWNLOADS" folder and launches the application. The .NET CLR loads the malicious DLL from the downloads folder, and calls its DLL "MainMethod.dll," which launches the attack.

However, using a hybrid application wherein a .NET application is hosted on a native binary unmanaged application, the call to version.dll can be intercepted, and the local copy of version.dll can be scanned, checked against digital signatures, hashed, checked against a global security database such as MCAFEE, LLC's Global Threat Intelligence (GTI), or other checks may be performed. If version.dll is found to be malicious, then the native parent unmanaged application is terminated, and execution ceases. Other security action could include notifying the user, notifying a security administrator, notifying an enterprise actor, notifying a security services provider, initiating a scan, or taking some other security action to ensure the safety of the user's system.

A system and method for securing an application framework from shared library sideload vulnerabilities will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a hardware platform 100. In this example, hardware platform 100 includes a processor 140 and a memory 144. Processor 140 and memory 144 could be a microprocessor, CPU, virtual machine processor, virtual memory, or any other species of processor, digital signal processor (DSP), or other digital logic element.

Memory 144 hosts a software ecosystem 130. Software ecosystem 130 may be provided, for example, by instructions stored on a transitory or non-transitory computer readable storage medium, having stored thereon executable instructions to provide the software ecosystem. At runtime, processor 140 accesses volatile or nonvolatile memory 144 to load instructions to provide software ecosystem 130. Processor 140 then sequentially executes the instructions.

In this illustration, software ecosystem 130 includes an operating system 124 and native unmanaged applications 128. Operating system 124 may include low-level drivers, services, and other common operating system features. Operating system 124 could be, for example, a Microsoft Windows operating system, a Macintosh iOS or OS X operating system, a Linux operating system, a Unix operating system, or some other operating system.

Native applications 128 run on "bare metal," or closer to bare metal than .NET ecosystem 120. For example, if operating system 124 is provided on a virtual machine (VM), native applications 128 do not execute on bare metal, but within the VM framework. However, the instructions provided by native applications 128 are still lower level than for .NET ecosystem 120. Depending on the security model, native applications 128 may have greater or unlimited access to system services, hardware, operating system hooks, and other features.

.NET ecosystem 120 is an ecosystem in which .NET applications 104 can run and operate. .NET applications 104 are not native applications like unmanaged native applications 128. Rather, .NET application 104 may be designed in a CLI-compliant computer language, and may then be compiled into an intermediate CIL. .NET application 104 may appear to be a standard executable file, but it does not run as native binary code. Rather, the .NET CLR 110 interprets the CIL and runs the CIL within the .NET CLR 110.

.NET ecosystem 120 also includes .NET framework 108, which may include class libraries and other framing structures that provide the structure of .NET ecosystem 120, as well as additional features provided by the classes. In some examples, .NET framework 108 may be an open source Mono implementation for Linux, or other implementation by way of nonlimiting example.

OS-level drivers 112 may be DLLs that are located within operating system 124. These may include, for example, drivers such as system32.dll, kernel32.dll, kernel64.dll, version.dll, or any other drivers that may be used by .NET application 104. Common DLLs that may be exploited by a hacker to launch attacks in .NET applications are listed in the table below.

TABLE 1

Common Exploitable DLLs

| Description | DLL Path |
| --- | --- |
| Advanced Windows 32 Base API | C:\Windows\SysWOW64\advapi32.dll |
| Application Compatibility Client Library | C:\Windows\SysWOW64\apphelp.dll |
| Windows Cryptographic Primitives Library | C:\Windows\SysWOW64\bcryptprimitives.dll |
| Microsoft .NET Runtime Common Language Runtime - Workstation | C:\Windows\Microsoft.NET\Framework\v4.0.30319\clr.dll |
| Microsoft .NET Runtime Just-In-Time Compiler | C:\Windows\Microsoft.NET\Framework\v4.0.30319\clrjit.dll |
| Microsoft COM for Windows | C:\Windows\SysWOW64\combase.dll |
| ConsoleApp1 | C:\Users\vpaul\source\repos\ConsoleApp1\bin\Release\ConsoleApp1.exe |
| Microsoft CoreMessaging Dll | C:\Windows\SysWOW64\CoreMessaging.dll |
| Microsoft Core UI Components Dll | C:\Windows\SysWOW64\CoreUIComponents.dll |
| Crypto API32 | C:\Windows\SysWOW64\crypt32.dll |
| Base cryptographic API DLL | C:\Windows\SysWOW64\cryptbase.dll |
| Microsoft Desktop Window Manager API | C:\Windows\SysWOW64\dwmapi.dll |
| GDI Client DLL | C:\Windows\SysWOW64\gdi32.dll |
| GDI Client DLL | C:\Windows\SysWOW64\gdi32full.dll |
| Multi-User Windows IMM32 API Client DLL | C:\Windows\SysWOW64\imm32.dll |
| AppModel API Host | C:\Windows\SysWOW64\kernel.appcore.dll |
| Windows NT BASE API Client DLL | C:\Windows\SysWOW64\kernel32.dll |
| Windows NT BASE API Client DLL | C:\Windows\SysWOW64\KernelBase.dll |
| McAfee HookCore Injected Environment | C:\Program Files (x86)\Common Files\McAfee\SystemCore\mfehcinj.dll |
| McAfee HookCore Thin Hook Environment | C:\Program Files (x86)\Common Files\McAfee\SystemCore\mfehcthe.dll |
| ASN.1 Runtime APIs | C:\Windows\SysWOW64\msasn1.dll |
| Microsoft .NET Runtime Execution Engine | C:\Windows\SysWOW64\mscoree.dll |
| Microsoft .NET Runtime Execution Engine | C:\Windows\Microsoft.NET\Framework\v4.0.30319\mscoreei.dll |
| Microsoft Common Language Runtime Class Library | C:\Windows\assembly\NativeImages_v4.0.30319_32\mscorlib\a5a47e8e5e2880adecca43eb928673f1\mscorlib.ni.dll |
| MSCTF Server DLL | C:\Windows\SysWOW64\msctf.dll |
| Microsoft ® C Runtime Library | C:\Windows\SysWOW64\msvcp_win.dll |
| Microsoft ® C Runtime Library | C:\Windows\SysWOW64\msvcr120_clr0400.dll |
| Windows NT CRT DLL | C:\Windows\SysWOW64\msvcrt.dll |
| NT Layer DLL | C:\Windows\SysWOW64\ntdll.dll |
| NT Layer DLL | C:\Windows\System32\ntdll.dll |
| Windows NT MARTA provider | C:\Windows\SysWOW64\ntmarta.dll |
| Microsoft OLE for Windows | C:\Windows\SysWOW64\ole32.dll |

TABLE 1-continued

Common Exploitable DLLs

| Description | DLL Path |
| --- | --- |
| Active Accessibility Core Component | C:\Windows\SysWOW64\oleacc.dll |
| Active Accessibility Resource DLL | C:\Windows\SysWOW64\oleaccrc.dll |
| OLEAUT32.DLL | C:\Windows\SysWOW64\oleaut32.dll |
| Remote Procedure Call Runtime | C:\Windows\SysWOW64\rpcrt4.dll |
| Host for SCM/SDDL/LSA Lookup APIs | C:\Windows\SysWOW64\sechost.dll |
| SHCORE | C:\Windows\SysWOW64\SHCore.dll |
| Shell Light-weight Utility Library | C:\Windows\SysWOW64\shlwapi.dll |
| Security Support Provider Interface | C:\Windows\SysWOW64\sspicli.dll |
| .NET Framework | C:\Windows\assembly\NativeImages_v4.0.30319_32\System.Drawing\8175b99ae4976023c6a5cdf95f7d73c4\System.Drawing.ni.dll |
| .NET Framework | C:\Windows\assembly\NativeImages_v4.0.30319_32\System\898c4d39831f90a1288b65041277a311\System.ni.dll |
| .NET Framework | C:\Windows\assembly\NativeImages_v4.0.30319_32\System.Windows.Forms\52b6626c09f8324495dd1a649245eb93\System.Windows.Forms.ni.dll |
| TextInputFramework.DYNLINK | C:\Windows\SysWOW64\TextInputFramework.dll |
| EDR Trace Scanner Injected Environment | C:\Program Files\McAfee\MAR\ts_hc_x86.dll |
| Microsoft ® C Runtime Library | C:\Windows\SysWOW64\ucrtbase.dll |
| Multi-User Windows USER API Client DLL | C:\Windows\SysWOW64\user32.dll |
| Microsoft UxTheme Library | C:\Windows\SysWOW64\uxtheme.dll |
| Version Checking and File Installation Libraries | C:\Windows\SysWOW64\version.dll |
| Web Control | C:\Program Files (x86)\McAfee\Endpoint Security\x86\Web Control\wchook.dll |
| Win32u | C:\Windows\SysWOW64\win32u.dll |
| Microsoft Trust Verification APIs | C:\Windows\SysWOW64\wintrust.dll |
| Windows Base Types DLL | C:\Windows\SysWOW64\WinTypes.dll |
| Win32 Emulation on NT64 | C:\Windows\System32\wow64.dll |
| AMD64 Wow64 CPU | C:\Windows\System32\wow64cpu.dll |
| Wow64 Console and Win32 API Logging | C:\Windows\System32\wow64win.dll |

When .NET application 104 launches, .NET framework 108 causes .NET application 104 to first scan the local directory for local DLL files 116. If a local DLL file is found with the right name, then the OS-level driver 112 with the same name is not used. For example, version.dll is a common DLL loaded by most applications. .NET framework 108 will first search local DLL files 116 for version.dll. Only if version.dll is not found locally will .NET framework 108 then search OS-level drivers 112. By design, there is currently no way for .NET application 104 to prevent this searching of local files or to otherwise interfere. Essentially, .NET framework 108 loads the local DLL files 116 outside of the purview of .NET application 104.

As discussed above, this creates a potential security aperture. If .NET application 104 is located in a common directory such as the user's "DOWNLOADS" directory, a malicious actor can interfere with the operation of .NET application 104 by causing malicious versions of certain DLLs to be loaded into that directory. Furthermore, if a common DLL such as version.dll or kernel32.dll is loaded into the user's download directory, then not just one application may be compromised, but any .NET application launched from that directory can be compromised.

Figure 2:
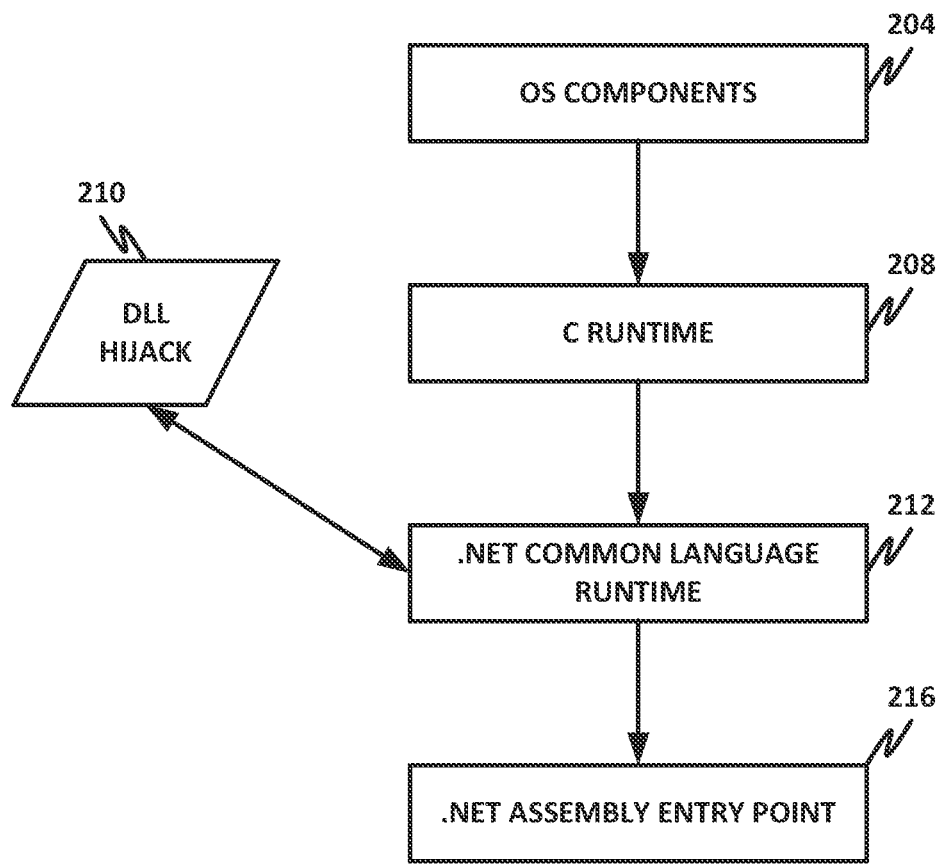
FIG. 2 is a flowchart illustrating DLL hijacking.

FIG. 2 is a flowchart illustrating DLL hijacking. In FIG. 2, OS components 204 call a C runtime 208. C runtime 208 then calls the .NET CLR 212. .NET CLR 212 executes outside the purview of a .NET application, and acts as a wrapper around the .NET application. By design, .NET applications are not permitted to interfere with the function of .NET CLR 212.

.NET CLR 212 searches the local directory of the .NET application for a certain list of DLLs. If a malicious actor has managed to load a malicious DLL into that directory, then a DLL hijack occurs in block 210.

The .NET CLR then proceeds to the .NET assembly entry point in block 216. At this point, malicious instructions have been loaded into the software, and there is no way for the .NET application to mitigate this. The loading of the DLLs occurs completely outside of the purview of the .NET application. Thus, when the .NET CLR 212 enters the .NET assembly entry point 216, the malicious code is executed without any possibility for remedial action by the .NET application.

Figure 3:
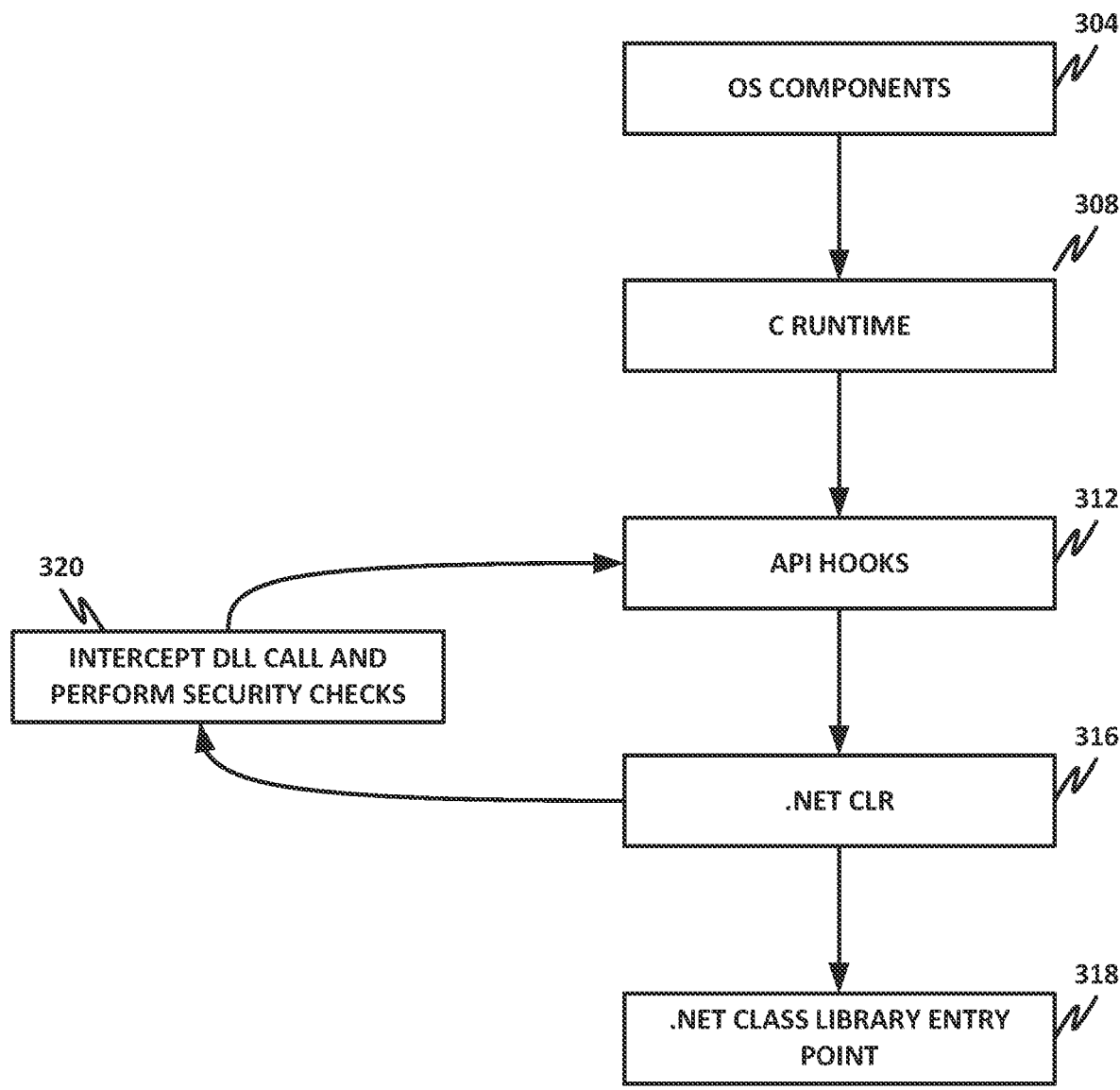
FIG. 3 is a block diagram of an improved system in which DLL sideload security is provided.

FIG. 3 is a block diagram of an improved system in which DLL sideload security is provided. In this system, OS components 304 load a C runtime 308, as in the case of FIG. 2. However, the .NET application in this case is not hosted directly onto the .NET CLR 316.

Instead, a native unmanaged C++ application acts as a wrapper or framework around the .NET application. The .NET application itself is compiled not as an executable, but rather as a DLL. The native application then wraps around the .NET DLL application, and implements .NET CLR 316 as a COM object. This gives the native wrapper application full API control over the operating system. Using this control, the native unmanaged application inserts API hooks 312 that intercept .NET CLR 316's loading action for loading a list of DLLs.

When .NET CLR 316 attempts to load DLLs, API hooks 312 intercept the DLL call in block 320. A security module within the native unmanaged wrapper application can then perform security checks on the DLLs that are attempting to be loaded. These security checks could take the form of, for example, scanning the files with an antivirus scanner, checking hashes of the files against known hashes of malicious applications or DLLs, checking a global or enterprise security database, or performing some other security action.

If any of the DLLs that the .NET CLR 316 tries to load are found to be malicious, then the native wrapper application terminates completely, thus preventing the loading of the malicious DLL. In some embodiments, further security actions may be taken, such as notifying the user or a security actor.

Only once all of the DLLs have been safely scanned and loaded, is the application permitted to proceed to the .NET class library entry point 318.

Figure 4:
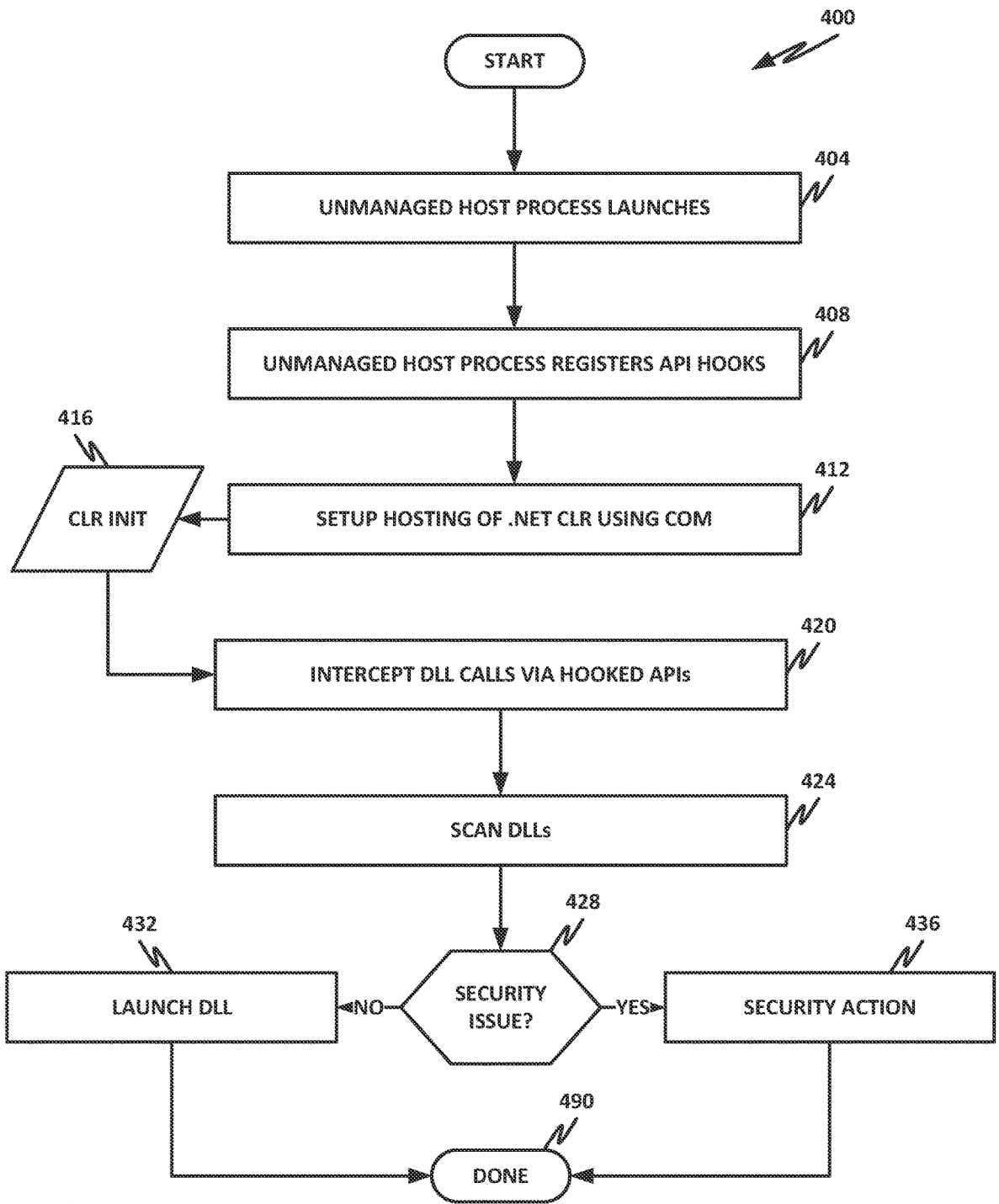
FIG. 4 is a flowchart of a method of performing DLL sideload mitigation.

FIG. 4 is a flowchart of a method 400 of performing DLL sideload mitigation.

Starting in block 404, the unmanaged host process launches. As described above, the unmanaged host process is a native application that may be written in a common language such as C++. Because the unmanaged host process is a native application, it is not subject to the restrictions of the .NET framework.

In block 408, the unmanaged host process registers API hooks to intercept the .NET CLR's sideloading of DLLs, for example from the local directory. Other directory locations to be searched may include, by way of illustrative and nonlimiting example, the present working directory, a system directory, directories in an operating system variable (such as PATH, LD_LIBRARY_PATH, LIBPATH, etc.), an operating system library directory, or other.

In block 412, the native application sets up hosting of the .NET CLR using the common object model (COM). This means that the unmanaged process essentially acts as a host for the entire .NET framework.

In block 416, the CLR is initialized. As part of the CLR initialization, the CLR will attempt to load certain DLLs by first scanning the local directory for the DLLs by name, and then looking in common operating system directories for the DLLs by name.

When the CLR scans a local directory to attempt to load DLLs by name, the API hooks intercept the DLL calls in block 420. The hooked API calls enable the unmanaged host process to perform additional security verification in addition to simply loading the DLL. For example, the DLLs could be scanned, hashed, or otherwise subjected to a security verification.

In block 424, the security subroutines of the unmanaged host process scan the DLLs to determine if any of them are malicious, or have any other security issues.

In decision block 428, the unmanaged host process determines whether security issues were found in connection with each DLL.

In block 432, if no issues were found, then the .NET application is launched as a DLL using the unmanaged process as the host process for the DLL.

Returning to block 428, if a security issue is found with any of the DLLs, then in block 436, a security action may be taken. This could include terminating the unmanaged host process, providing a security notification, or performing some other security action.

In block 490, the method is done.

Figure 5:
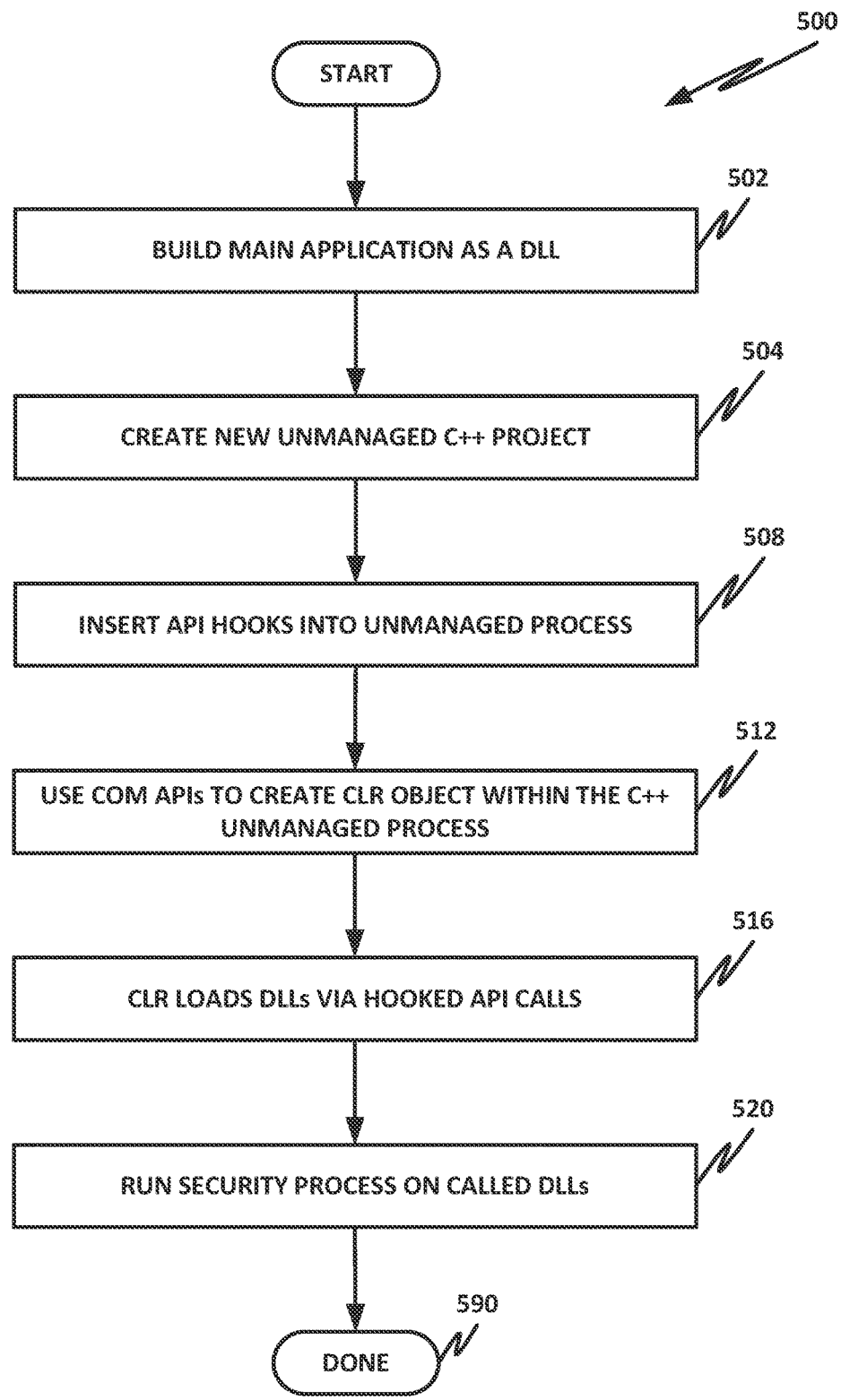
FIG. 5 is a flowchart of a method of developing a .NET application with additional DLL sideload security features.

FIG. 5 is a flowchart of a method 500 of developing a .NET application with the additional DLL sideload security features of the present specification.

In block 504, the application developer creates a new unmanaged C++ project.

In block 508, in addition to developing the wrapper code that will provide the .NET environment, the application programmer inserts API hooks into the unmanaged process.

In block 512, the application programmer uses COM APIs to create a CLR object within the C++ unmanaged process. This enables the C++ unmanaged process to act as a wrapper around the entire .NET framework, and essentially to implement the .NET framework within the unmanaged C++ process.

In block 516, the CLR loads DLLs via the hooked API calls. As described above, the hooked API calls do not simply naïvely load the DLLs without inspection. Rather, the unmanaged host process may include security subroutines that first scan the DLLs to ensure that they are safe to load. Scanning can be performed on all DLLs, including on operating system level DLLs. However, scanning may be particularly of interest to sideloading DLLs from a local directory, where it is easier for an attacker to gain access and to insert malicious code.

In block 520, the unmanaged C++ process runs the security subroutines on all called DLLs, and determines whether the DLLs are safe to run. As described above, if the DLLs are safe to run, the application is permitted to continue running. If they are not, then some security action may be taken, including completely terminating the unmanaged host process. In block 590, the method is done.

An implementation of a .NET application, namely a version of the MCAFEE, LLC True Key™ password manager, was developed according to the above process. It was found that this version of True Key™ was able to load successfully, and to successfully avoid loading malicious DLLs that could be located in the application directory of the True Key™ executable runtime.

The unmanaged wrapper application in the specific implementation example was specific to the True Key™ application. However, a similar application may be developed and provided as a generic framework to wrap around any .NET application. Thus, any .NET application can gain the benefit of the additional security features, including DLL sideload security, provided by this unmanaged wrapper application.

Figure 6:
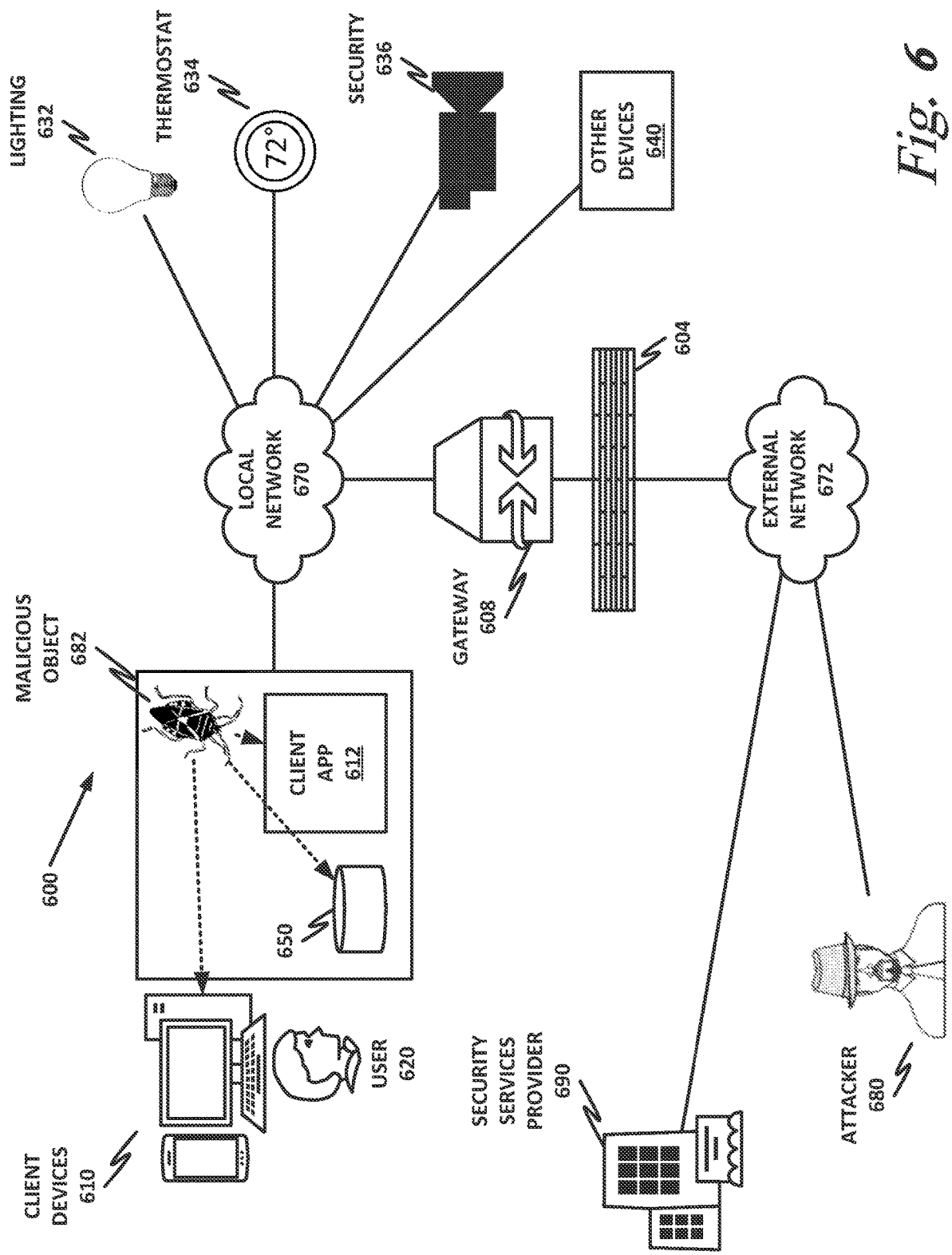
FIG. 6 is a block diagram of selected elements of a security ecosystem.

FIG. 6 is a block diagram of a security ecosystem 600. Embodiments of security ecosystem 600 may be configured or adapted for securing an application framework from shared library sideload vulnerabilities, as disclosed in the present specification.

In the example of FIG. 6, security ecosystem 600 may be an enterprise, a government entity, a data center, a telecommunications provider, a "smart home" with computers, smart phones, and various internet of things (IoT) devices, or any other suitable ecosystem. Security ecosystem 600 is provided herein as an illustrative and nonlimiting example of a system that may employ, and benefit from, the teachings of the present specification.

Within security ecosystem 600, one or more users 620 operate one or more client devices 610. A single user 620 and single client device 610 are illustrated here for simplicity, but a home or enterprise may have multiple users, each of which may have multiple devices, such as desktop computers, laptop computers, smart phones, tablets, hybrids, or similar.

Client devices 610 may be communicatively coupled to one another and to other network resources via local network 670. Local network 670 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 670 may also include one or more servers, firewalls, routers, switches, security appliances, antivirus servers, or other network devices, which may be single-purpose appliances, virtual machines, containers, or functions. Some functions may be provided on client devices 610.

In this illustration, local network 670 is shown as a single network for simplicity, but in some embodiments, local network 670 may include any number of networks, such as one or more intranets connected to the internet. Local network 670 may also provide access to an external network, such as the internet, via external network 672. External network 672 may similarly be any suitable type of network.

Local network 670 may connect to the internet via gateway 608, which may be responsible, among other things, for providing a logical boundary between local network 670 and external network 672. Local network 670 may also provide services such as dynamic host configuration protocol (DHCP), gateway services, router services, and switching services, and may act as a security portal across local boundary 604.

Local network 670 may also include a number of discrete IoT devices. For example, local network 670 may include IoT functionality to control lighting 632, thermostats or other environmental controls 634, a security system 636, and any number of other devices 640. Other devices 640 may include, as illustrative and nonlimiting examples, network attached storage (NAS), computers, printers, smart televisions, smart refrigerators, smart vacuum cleaners and other appliances, and network connected vehicles.

Local network 670 may communicate across local boundary 604 with external network 672. Local boundary 604 may represent a physical, logical, or other boundary. External network 672 may include, for example, websites, servers, network protocols, and other network-based services. In one example, an attacker 680 (or other similar malicious or negligent actor) also connects to external network 672. A security services provider 690 may provide services to local network 670, such as security software, security updates, network appliances, or similar. For example, MCAFEE, LLC provides a comprehensive suite of security services that may be used to protect local network 670 and the various devices connected to it.

It may be a goal of users 620 to successfully operate devices on local network 670 without interference from attacker 680. In one example, attacker 680 is a malware author whose goal or purpose is to cause malicious harm or mischief, for example, by injecting malicious object 682 into client device 610. Once malicious object 682 gains access to client device 610, it may try to perform work such as social engineering of user 620, a hardware-based attack on client device 610, modifying storage 650 (or volatile memory), modifying client application 612 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 680 to leverage against local network 670.

Malicious harm or mischief may take the form of installing root kits or other malware on client devices 610 to tamper with the system, installing spyware or adware to collect personal and commercial data, defacing websites, operating a botnet such as a spam server, or simply to annoy and harass users 620. Thus, one aim of attacker 680 may be to install his malware on one or more client devices 610 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 680 may also want to commit industrial or other espionage, such as stealing classified or proprietary data, stealing identities, or gaining unauthorized access to enterprise resources. Thus, attacker 680's strategy may also include trying to gain physical access to one or more client devices 610 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 680. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 670 may contract with or subscribe to a security services provider 690, which may provide security services, updates, antivirus definitions, patches, products, and services. MCAFEE, LLC is a nonlimiting example of such a security services provider that offers comprehensive security and antivirus solutions. In some cases, security services provider 690 may include a threat intelligence capability such as the global threat intelligence (GTI™) database provided by MCAFEE, LLC or similar competing products. Security services provider 690 may update its threat intelligence database by analyzing new candidate malicious objects as they appear on client networks and characterizing them as malicious or benign.

Other security considerations within security ecosystem 600 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 7:
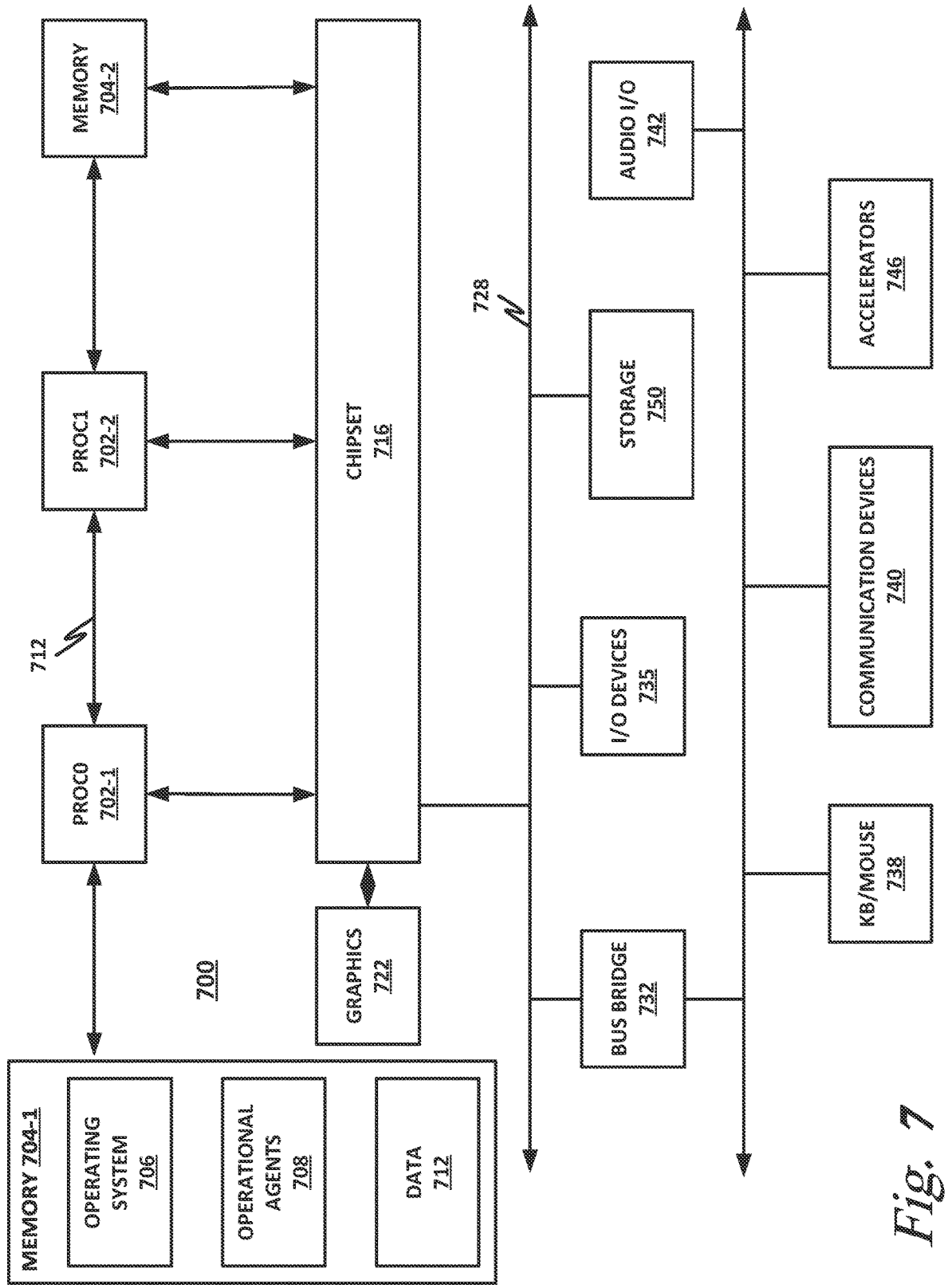
FIG. 7 is a block diagram of selected elements of a hardware platform.

FIG. 7 is a block diagram of a hardware platform 700. Embodiments of hardware platform 700 may be configured or adapted for securing an application framework from shared library sideload vulnerabilities, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via network interface 748, or retrieved from another source via any suitable interconnect. Once received (from any source), the instructions may be loaded into memory 704, and may then be executed by one or more processor 702 to provide elements such as an operating system 706, operational agents 708, or data 712.

Figure 9:
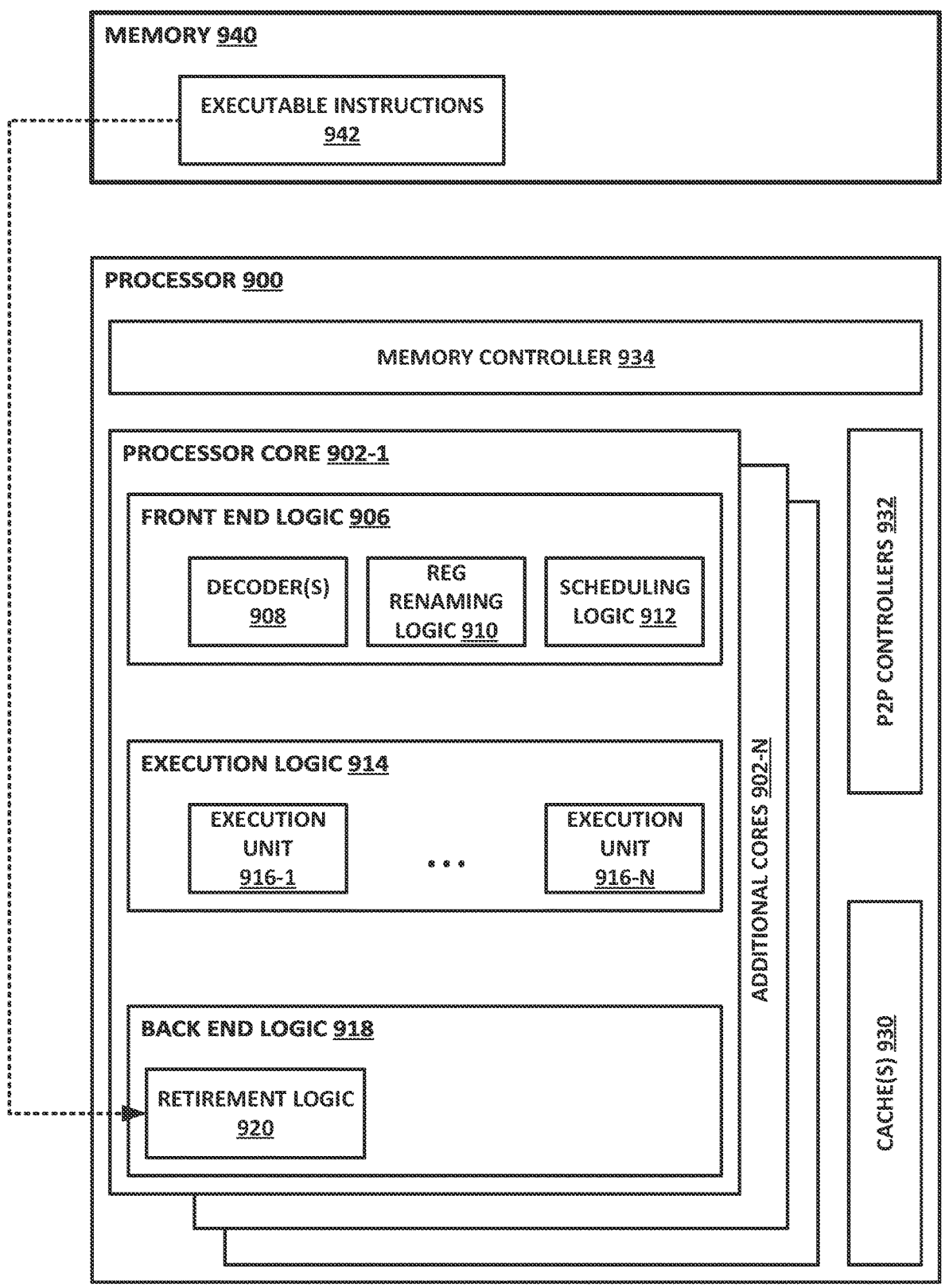
FIG. 9 is a block diagram of selected elements of a processor.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE, but one embodiment is illustrated in FIG. 9. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high-performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a CPU, or on one or more different dies or packages. Each chipset may support any suitable number of CPUs 702. A chipset 716 (which may be a chipset, uncore, Northbridge, Southbridge, or other suitable logic and circuitry) may also include one or more controllers to couple other components to one or more CPUs.

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with processor 710 via a bus. For example, some memories may be connected via a system bus, or in a data center, memory may be accessible in a remote DMA (RDMA) configuration.

Memory 704 may include any form of volatile or nonvolatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of CPUs 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, network interface 748, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by network interface 748 and the various I/O devices described herein. This may include, for example, various USB, FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O devices 742, a data storage device 744, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more nontransitory computer-readable mediums having stored thereon executable instructions operable to instruct a processor to provide operational functions. At an appropriate time, such as upon booting hardware platform 700 or upon a command from operating system 706 or a user or security administrator, processor 702 may retrieve a copy of the operational agent (or software portions thereof) from storage 750 and load it into memory 704. Processor 710 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 748 may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 748 may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 8. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

Figure 8:
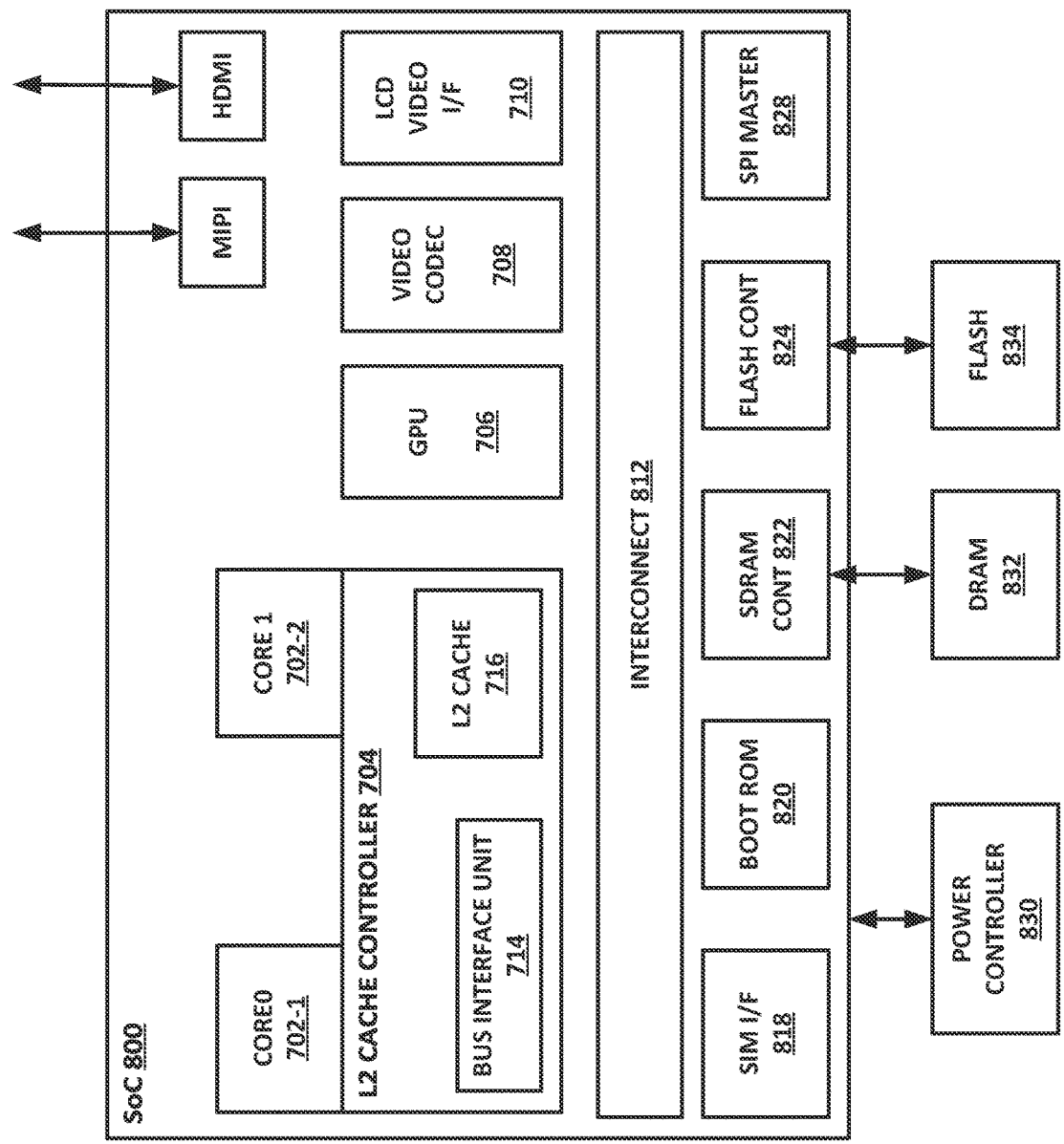
FIG. 8 is a block diagram of selected elements of a system-on-a-chip (SoC).

FIG. 8 is a block illustrating selected elements of an example SoC 800. Embodiments of SoC 800 may be configured or adapted for securing an application framework from shared library sideload vulnerabilities, as disclosed in the present specification.

At least some of the teachings of the present specification may be embodied on an SoC 800, or may be paired with an SoC 800. SoC 800 may include, or may be paired with, an advanced reduced instruction set computer machine (ARM) component. For example, SoC 800 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 800 could also be integrated into, for example, a personal computer, server, video processing components, laptop computer, notebook computer, netbook, or touch-enabled device.

As with hardware platform 700 above, SoC 800 may include multiple cores 802a and 802b. In this illustrative example, SoC 800 also includes an L2 cache control 804, a graphics processing unit (GPU) 806, a video codec 808, a liquid crystal display (LCD) I/F 810 and an interconnect 812. L2 cache control 804 can include a bus interface unit 814, a L2 cache 816. Liquid crystal display (LCD) I/F 810 may be associated with mobile industry processor interface (MIPI)/high-definition multimedia interface (HDMI) links that couple to an LCD.

SoC 800 may also include a subscriber identity module (SIM) I/F 818, a boot read-only memory (ROM) 820, a synchronous dynamic random-access memory (SDRAM) controller 822, a flash controller 824, a serial peripheral interface (SPI) master 828, a suitable power control 830, a dynamic RAM (DRAM) 832, and flash 834. In addition, one or more embodiments include one or more communication capabilities, interfaces, and features such as instances of Bluetooth™ 836, a 3G modem 838, a global positioning system (GPS) 840, and an 802.11 Wi-Fi 842.

Designers of integrated circuits such as SoC 800 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a graphics processing unit (GPU) engine, a security controller, and many other IP blocks. In many cases, each of these IP blocks has its own embedded microcontroller.

FIG. 9 is a block diagram illustrating selected elements of a processor 900. Embodiments of processor 900 may be configured or adapted for securing an application framework from shared library sideload vulnerabilities, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, central processor unit (CPU), advanced RISC (reduced instruction-set computing) machine (ARM), digital signal processor (DSP), field-programmable gate array (FPGA), graphics processing unit, programmable logic array, application-specific integrated circuit (ASIC), or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 900 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 900 includes one or more processor cores 902, including core 902-1-902-N. Cores 902 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 900 may include at least one shared cache 930, which may be treated logically as part of memory 940. Caches 930 may be filled according to known caching techniques, and may store instructions and/or data that may be used by one or more components of processor 900.

Processor 900 may include an integrated memory controller (MC) 934, to communicate with memory 940. Memory controller 934 may include logic and circuitry to interface with memory 940, and may also include a cache controller to handle filling and evicting instructions and data to and from cache 930.

By way of example, each core 902 may include front-end logic 906, execution logic 914, and back-end logic 918.

In the illustrated embodiment, front-end logic 906 includes an instruction decoder or decoders 908, register renaming logic 910, and scheduling logic 912. Decoder 908 may decode instructions received. Register renaming logic 910 may provide register renaming, for example to facilitate pipelining. Scheduling logic 912 may schedule instruction execution, and may provide out-of-order (OOO) execution. Front-end logic 906 may fetch incoming instructions, perform various processing (e.g., caching, decoding, branch predicting, etc.), and pass instructions to execution logic 914.

Execution logic 914 includes one or more execution units 916-1-916-N. Execution units 916 may include hardware instructions and microcode to carry out the provided instructions.

Backend logic 918 includes retirement logic 920. Core 902 may provide for speculative execution of instructions, branch prediction, and similar. Retirement logic 920 may be configured to determine which predicted instructions were actually needed by the program flow.

Processor 900 may also include a PtP controller 932, which enables connection to an uncore, chipset, Northbridge, Southbridge, or bus, by way of example.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, a computing apparatus, comprising: a processor and a memory; an operating system; an application framework including instructions to search a target directory for one or more shared libraries and to attempt to load the one or more shared libraries if found; and an application comprising: a library file comprising a primary feature module to provide a primary feature of the application, the primary feature module structured to operate within the application framework, wherein the library file is not independently executable by the operating system; and an unmanaged executable binary to host the library file, wherein the unmanaged executable binary is not managed by the application framework, and comprises hooks to intercept the application framework's attempt to load the one or more shared libraries, and to provide security services to the one or more shared libraries before permitting the application framework to attempt to load the one or more shared libraries.

There is further disclosed an example computing apparatus, wherein the operating system is a Microsoft Windows operating system, and wherein the application framework is a Microsoft .NET application framework.

There is further disclosed an example computing apparatus, wherein the application framework is an open-source implementation of a Microsoft .NET application framework.

There is further disclosed an example computing apparatus, wherein the target directory is a local directory of the unmanaged executable.

There is further disclosed an example computing apparatus, wherein the target directory is an operating system directory.

There is further disclosed an example computing apparatus, wherein the one or more shared libraries are Unix or Linux shared object libraries.

There is further disclosed an example computing apparatus, wherein the one or more shared libraries are Windows dynamic link libraries.

There is further disclosed an example computing apparatus, wherein the application framework instructions are to search for the one or more shared libraries by name.

There is further disclosed an example computing apparatus, wherein the security services comprise performing an antivirus scan of the one or more libraries before permitting the application framework to load the one or more shared libraries.

There is further disclosed an example computing apparatus, wherein the security services comprise taking a hash of the one or more libraries and comparing the hash to known malicious software.

There is further disclosed an example computing apparatus, wherein the security services comprise querying a reputation cache for a reputation of the one or more shared libraries.

There is further disclosed an example computing apparatus, wherein the unmanaged executable binary comprises instructions to kill an instance of the unmanaged executable binary if a security operation fails.

There is further disclosed an example computing apparatus, wherein the unmanaged executable binary comprises instructions to load an interpreter of the application framework as an object according to an object model.

There is further disclosed an example computing apparatus, wherein the interpreter is a Microsoft .NET common language runtime.

There is also disclosed an example of one or more tangible, non-transitory computer-readable storage mediums having stored thereon executable instructions to: provide a main library having code for a primary application feature, the library file being non-executable independently, and structured to operate within an application framework, wherein the application framework comprises instructions to search a target directory for a list of shared libraries, and to attempt to load the shared libraries, if found, outside the purview of the main library; and launch an unmanaged executable process and host the main library on the unmanaged executable process, wherein the unmanaged executable process is unmanaged with respect to the application framework, and includes operating system hooks to intercept the application framework's attempt to load the one or more shared libraries, and to subject the libraries, if found, to a security regimen, wherein the application framework's attempt to load the shared libraries is blocked if a shared library fails the security regimen.

There is further disclosed an example of one or more tangible, non-transitory computer-readable mediums, wherein the operating system is a Microsoft Windows operating system, and wherein the application framework is a Microsoft .NET application framework.

There is further disclosed an example of one or more tangible, non-transitory computer-readable mediums, wherein the application framework is an open-source implementation of a Microsoft .NET application framework.

There is further disclosed an example of one or more tangible, non-transitory computer-readable mediums, wherein the target directory is a local directory of an executable object that provides the unmanaged executable process.

There is further disclosed an example of one or more tangible, non-transitory computer-readable mediums, wherein the target directory is an operating system directory.

There is further disclosed an example of one or more tangible, non-transitory computer-readable mediums, wherein the shared libraries are Unix or Linux shared object libraries.

There is further disclosed an example of one or more tangible, non-transitory computer-readable mediums, wherein the shared libraries are Windows dynamic link libraries.

There is further disclosed an example of one or more tangible, non-transitory computer-readable mediums, wherein the application framework is to search for the shared libraries by name.

There is further disclosed an example of one or more tangible, non-transitory computer-readable mediums, wherein the security regimen comprises an antivirus scan of the one or more libraries.

There is further disclosed an example of one or more tangible, non-transitory computer-readable mediums, wherein the security regimen comprises hashing a library and comparing the hash to known malicious software.

There is further disclosed an example of one or more tangible, non-transitory computer-readable mediums, wherein the security regimen comprises querying a reputation cache for a reputation for a library.

There is further disclosed an example of one or more tangible, non-transitory computer-readable mediums, wherein the security regimen further comprises terminating the unmanaged executable process if any library fails the security regimen.

There is further disclosed an example of one or more tangible, non-transitory computer-readable mediums, wherein the unmanaged executable process includes instructions to load an interpreter of the application framework as an object according to an object model.

There is further disclosed an example of one or more tangible, non-transitory computer-readable mediums, wherein the interpreter is a Microsoft .NET common language runtime.

There is also disclosed an example method of providing enhanced security to an application framework that searches a target directory for shared libraries by name, and attempts to load any shared libraries found, outside the purview of a managed process, the method comprising: hosting a main process of the managed process as a library file under an unmanaged executable process; wherein the library file is structured to operate within the application framework; and wherein the unmanaged executable process is unmanaged with respect to the application framework, and includes operating system hooks to intercept the application framework's attempt to load the one or more shared libraries, and to subject the libraries, if found, to a security regimen, wherein the application framework's attempt to load the shared libraries is blocked if a shared library fails the security regimen.

There is further disclosed an example method, wherein the operating system is a Microsoft Windows operating system, and wherein the application framework is a Microsoft .NET application framework.

There is further disclosed an example method, wherein the application framework is an open-source implementation of a Microsoft .NET application framework.

There is further disclosed an example method, wherein the target directory is a local directory of an executable object that provides the unmanaged executable process.

There is further disclosed an example method, wherein the target directory is an operating system directory.

There is further disclosed an example method, wherein the shared libraries are Unix or Linux shared object libraries.

There is further disclosed an example method, wherein the shared libraries are Windows dynamic link libraries.

There is further disclosed an example method, wherein the application framework is to search for the shared libraries by name.

There is further disclosed an example method, wherein the security regimen comprises an antivirus scan of the one or more libraries.

There is further disclosed an example method, wherein the security regimen comprises hashing a library and comparing the hash to known malicious software.

There is further disclosed an example method, wherein the security regimen comprises querying a reputation cache for a reputation for a library.

There is further disclosed an example method, wherein the security regimen further comprises terminating the unmanaged executable process if any library fails the security regimen.

There is further disclosed an example method, wherein the unmanaged executable process loads an interpreter of the application framework as an object according to an object model.

There is further disclosed an example method, wherein the interpreter is a Microsoft .NET common language runtime.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer readable medium comprising instructions that, when executed, implement a method or realize an apparatus as illustrated in a number of the above examples.

What is claimed is:

1. A computing apparatus, comprising:
a processor and a memory;
an operating system;
a .NET application framework including instructions to provide managed execution of a library file within an application virtual machine, and to search a target directory for one or more dynamic link libraries (DLLs) and to attempt to load the one or more DLLs if found; and
an application comprising:
a library file comprising a primary feature module to provide a primary feature of the application, the primary feature module structured to operate within the .NET framework, wherein the library file is not independently executable outside of the .NET framework; and
an unmanaged executable binary to host the library file, wherein the unmanaged executable binary is not managed by the .NET framework, and comprises hooks to intercept the .NET framework's attempt to load the one or more DLLs, and to provide a security scan of the one or more DLLs before permitting the .NET framework to attempt to load the one or more DLLs.

2. The computing apparatus of claim 1, wherein the operating system is a Microsoft Windows operating system.

3. The computing apparatus of claim 1, wherein the .NET application framework is an open-source implementation of a Microsoft .NET application framework.

4. The computing apparatus of claim 1, wherein the target directory is a local directory of the unmanaged executable.

5. The computing apparatus of claim 1, wherein the target directory is an operating system directory.

6. The computing apparatus of claim 1, wherein the one or more shared libraries are Unix or Linux shared object libraries.

7. The computing apparatus of claim 1, wherein the one or more shared libraries are Windows dynamic link libraries.

8. The computing apparatus of claim 7, wherein the .NET application framework instructions are to search for the one or more shared libraries by name.

9. The computing apparatus of claim 1, wherein the unmanaged executable binary comprises instructions to kill an instance of the unmanaged executable binary if the security scan detects a security failure.

10. The computing apparatus of claim 1, wherein the unmanaged executable binary comprises instructions to load an interpreter of the application framework as an object according to an object model.

11. The computing apparatus of claim 10, wherein the interpreter is a Microsoft .NET common language runtime.

12. One or more tangible, non-transitory computer-readable storage mediums having stored thereon executable instructions that, when executed by a computer processor, cause the computer processor to:
provide a main .NET library having code for a primary application feature, the main .NET library file being non-executable outside of a .NET framework, wherein the.NET framework comprises instructions provide managed execution of a library file within an application virtual machine, and to search a target directory for a list of dynamic link libraries (DLLs), and to attempt to load one or more DLLs from the list, outside a purview of the main .NET library; and
launch an unmanaged executable process and host the main .NET library on the unmanaged executable process, wherein the unmanaged executable process is independent of the .NET framework, and includes operating system hooks into an operating system to intercept the .NET framework's attempt to load the one or more DLLs, and to subject the DLLs, if found, to a security regimen, wherein the .NET framework's attempt to load a DLL is blocked if the DLL fails the security regimen.

13. The one or more tangible, non-transitory computer-readable mediums of claim 12, wherein the operating system is a Microsoft Windows operating system.

14. The one or more tangible, non-transitory computer-readable mediums of claim 12, wherein the target directory is a local directory of an executable object that provides the unmanaged executable process.

15. The one or more tangible, non-transitory computer-readable mediums of claim 12, wherein the security regimen comprises an antivirus scan of the one or more DLLs.

16. The one or more tangible, non-transitory computer-readable mediums of claim 15, wherein the security regimen further comprises terminating the unmanaged executable process if any library fails the security regimen.

17. The one or more tangible, non-transitory computer-readable mediums of claim 12, wherein the security regimen comprises hashing a library and comparing the hash to known malicious software.

18. The one or more tangible, non-transitory computer-readable mediums of claim 12, wherein the security regimen comprises querying a reputation cache for a reputation for a library.

19. A method of providing enhanced security to a .NET framework that provides managed execution of a library file within an application virtual machine, and searches a target directory for shared libraries by name, and attempts to load any shared libraries found, outside a purview of a main .NET process, the method comprising:
hosting the main .NET process as a library file under an unmanaged executable process, wherein the unmanaged executable process is independent of the .NET framework; and
wherein the unmanaged executable process includes operating system hooks to intercept the.NET framework's attempt to load the shared libraries within an operating system, and to subject the shared libraries, if found, to a security scan, wherein the .NET framework's attempt to load the shared libraries is blocked if a shared library fails the security scan.

20. The method of claim 19, wherein the operating system is a Microsoft Windows operating system.

* * * * *